United States Patent [19]

Tanaka

[11] Patent Number: 5,227,767
[45] Date of Patent: Jul. 13, 1993

[54] INSTRUMENT ARRANGEMENT FOR AUTOMOTIVE VEHICLE

[75] Inventor: Yoichiro Tanaka, Kanagawa, Japan

[73] Assignee: Nissan Motor Co., Ltd., Yokohama, Japan

[21] Appl. No.: 931,438

[22] Filed: Aug. 20, 1992

Related U.S. Application Data

[63] Continuation of Ser. No. 660,075, Feb. 25, 1991, abandoned.

[30] Foreign Application Priority Data

Feb. 27, 1990 [JP] Japan .................................. 2-44549

[51] Int. Cl.⁵ .............................................. G09G 1/28
[52] U.S. Cl. ...................................... 340/702; 362/23; 362/27
[58] Field of Search ........................ 340/702, 815.15; 116/286; 362/23, 27, 29, 30

[56] References Cited

U.S. PATENT DOCUMENTS

| | | | |
|---|---|---|---|
| 3,433,940 | 6/1967 | Baez et al. | 362/27 |
| 4,647,902 | 3/1987 | Teshima et al. | 340/753 |
| 4,737,896 | 4/1988 | Mochizuki et al. | 362/23 |
| 4,791,745 | 12/1988 | Pohn | 40/546 |
| 4,965,564 | 10/1990 | Fabry et al. | 340/702 |
| 4,991,537 | 2/1991 | Muramatsu | 362/23 |

FOREIGN PATENT DOCUMENTS

| | | |
|---|---|---|
| 55-52177 | 4/1980 | Japan . |
| 58-172686 | 10/1983 | Japan . |
| 62-282225 | 12/1987 | Japan . |
| 63-122230 | 8/1988 | Japan . |
| 2023834 | 1/1980 | United Kingdom .................. 362/27 |

Primary Examiner—Ulysses Weldon
Assistant Examiner—Matthew Luu
Attorney, Agent, or Firm—Lowe, Price, LeBlanc & Becker

[57] ABSTRACT

An instrument arrangement for an automotive vehicle comprises front and rear housings, and an indicating portion arranged therebetween and having on surface on which luminophors are placed. Within the front housing are arranged a visible light source, and a black light source. The black light source is arranged to be more distant from the one surface of the indicating portion than the visible light source, thus reflecting light of the visible light source toward the indicating portion.

6 Claims, 3 Drawing Sheets

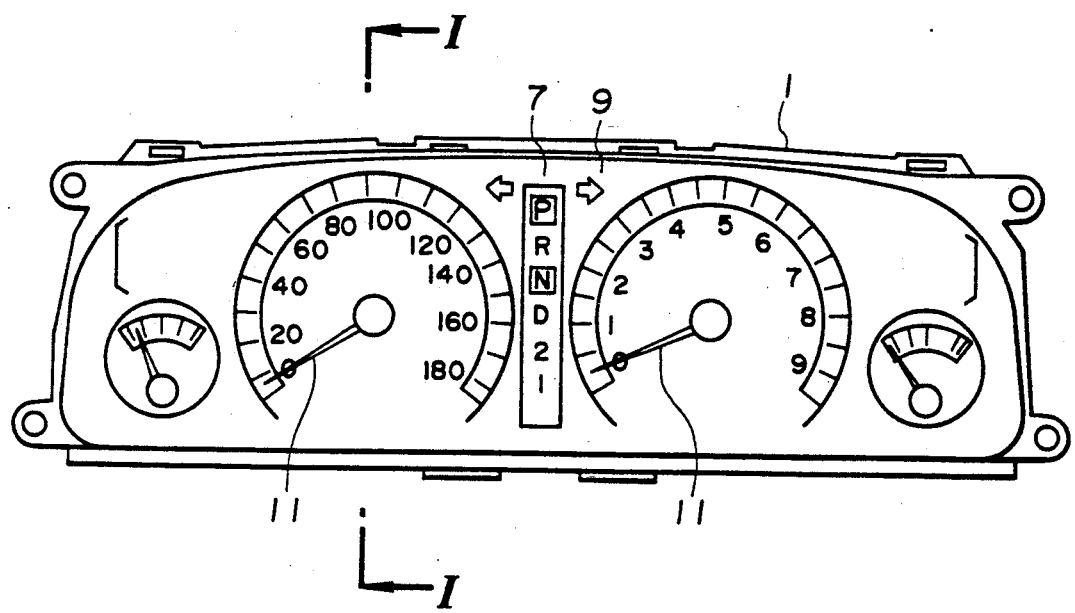
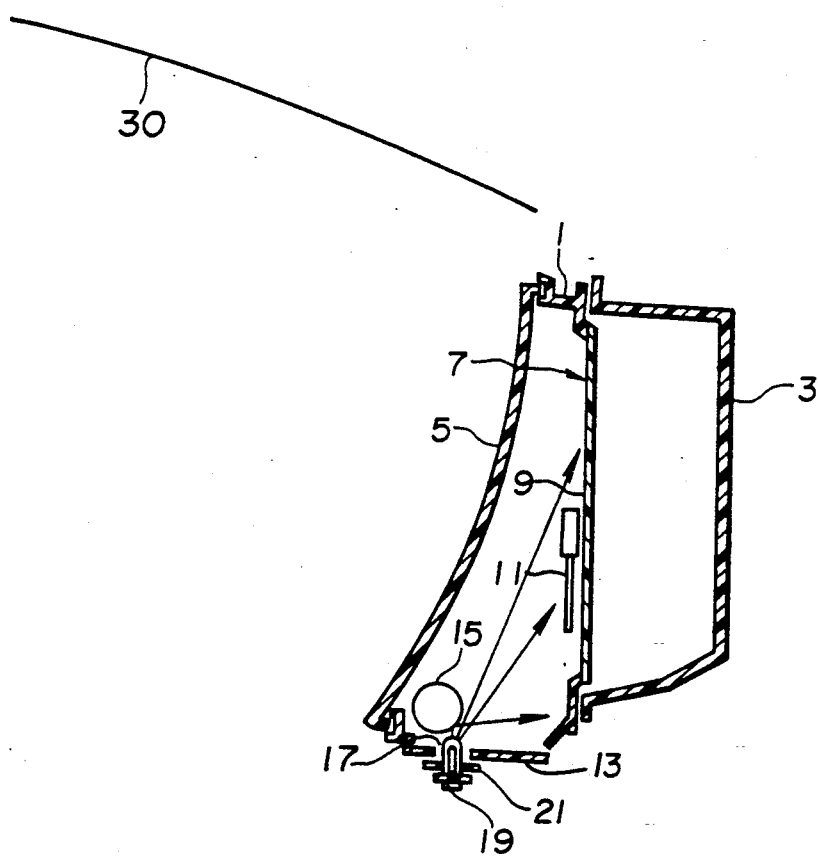
FIG.1
FIG.2

5,227,767

INSTRUMENT ARRANGEMENT FOR AUTOMOTIVE VEHICLE

This application is a continuation of application Ser. No. 07/660,075 filed Feb. 25, 1991, now abandoned.

BACKGROUND OF THE INVENTION

The present invention relates generally to an instrument arrangement for an automotive vehicle and, more particularly, to a lamp arrangement for irradiating an indicating portion thereof.

Various kinds of instrument arrangements for an automotive vehicle have been proposed in past years. One of such known instrument arrangements is disclosed, for example, in JP-A 58-172686.

This instrument arrangement has an indicating portion including characters, needles, etc. on which fluorescent materials are placed, and a so-called black light lamp as an excitation light source. When ultraviolet rays as emerged from the black light lamp fall on the characters, needles, etc. of the indicating portion, the fluorescent materials as placed thereon are excited to emit visible lights, resulting in an improvement of visibility of the indicating portion during driving in the dark or the night.

A problem encountered in the aforementioned instrument arrangement for an automotive vehicle is that since a mercury within the black light lamp has a freezing point not sufficiently low in temperature, intensity of radiation of the black light lamp decreases when the temperature in a cabin is not high, resulting in an insufficiency of brightness of the fluorescent materials placed on the characters, needles, etc. of the indicating portion.

Such problem may be solved by arranging an auxiliary light source for generating visible light in addition to the excitation light source.

Specifically, when intensity of radiation of the black light lamp decreases, the auxiliary light source is turned on to illuminate the indicating portion, thus preventing a decrease in visibility thereof. However, if the auxiliary light source is disposed in the instrument arrangement, there may arise another problem that the auxiliary light source, which is imaged in a front window of the vehicle, is in a driver's sight.

Referring to FIG. 6, visible light L of the auxiliary light source 103 as disposed in the instrument arrangement 101, which is reflected in the front window 105, reaches a passenger M.

In order to prevent a so-called front window reflection, a portion 109 of a hood 107 of the instrument arrangement 101 should be lengthened to the passenger M as indicated by a one-dot chain line in FIG. 6. This results in a restrained freedom of design for the instrument arrangement 101.

SUMMARY OF THE INVENTION

It is, therefore, an object of the present invention to provide an instrument arrangement for an automotive vehicle which includes an excitation light source for generating radiation to excite fluorescent materials, and an auxiliary light source for generating visible light, without a reflection of the auxiliary light source in a front window of the vehicle with a relatively shortened hood of the instrument arrangement.

There is provided, according to the present invention, an instrument arrangement for an automotive vehicle, comprising;

a housing; indicating means arranged within said housing, said indicating means having one surface;

first radiation means for generating a first radiation, said first radiation means being arranged within said housing on the side of said one surface of said indicating means;

second radiation means for generating a second radiation, said second radiation means being arranged within said housing on the side of said one surface of said indicating means, said second radiation means being arranged to be more distant from said one surface of said indicating means than said first radiation means are; and means for reflecting light of said first radiation means toward said indicating means.

BRIEF DESCRIPTION OF THE DRAWINGS

FIG. 1 is a front view of a combination meter as an example of an instrument arrangment for an automotive vehicle;

FIG. 2 is a longitudinal section taken along the line I—2 of FIG. 1, illustrating a first preferred embodiment of an instrument arrangement for an automotive vehicle according to the present invention;

DETAILED DESCRIPTION OF THE INVENTION

Figure 3:
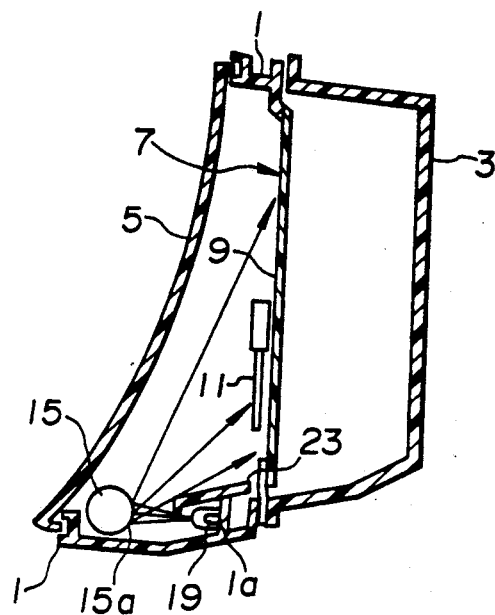
FIG. 3 is a view similar to FIG. 2, illustrating a second preferred embodiment of an instrument arrangement for an automotive vehicle according to the present invention.

Referring to the drawings, wherein like reference numerals designate corresponding parts throughout the views. Referring particularly to FIG. 1, an instrument arrangement for an automotive vehicle or combination meter includes a front housing 1, and a rear housing 3. A front cover 5 is attached to a front portion of the front housing 1, and an indicating portion 7 is disposed between the front and rear housings 1 and 3.

Within the rear housing 3 are arranged different instrument units (not shown).

The front cover 5 is constructed by a transparent material such as a glass.

The indicating portion 7 includes a dial 9, and a plurality of needles 11.

On the dial 9 are provided graduations, characters, etc. on which is placed a fluorescent paint having, as its principal ingredient, a fluorescent material such as $ZnS:Sn$, which assumes a dark gray in natural light, and emit light brown light when irradiated with ultraviolet rays. On the other portion or a background of the dial 9, a predetermined pattern is given or printed by a dark gray paint having a substantially the same color as the fluorescent material in natural light.

Additionally, on the plurality of needles 11 is placed another fluorescent paint having, as its principal ingredient, a fluorescent material such as $Y_2O_3:Eu$, which assumes a white in natural light, and radiates red light when irradiated with ultraviolet rays.

Thus, the indicating portion 7 has a plurality of luminophors.

Referring to FIG. 2, in a first preferred embodiment, a base plate 13 is arranged at a lower portion of the front housing 1. As an excitation light source, a black light lamp 15 is mounted to the base plate 13 on the front cover side thereof, and radiates ultraviolet rays. When the indicating portion 7 is irradiated therewith, the fluorescent materials as placed on the graduations, characters, needles, and the like are excited to emit visible lights. The black light lamp 15 is in the form of a straight tube, and extends substantially over the width of the front housing 1, i.e., from the right to the left as viewed in FIG. 1. The black light lamp 15 has electrodes at both ends thereof, which are connected to a power supply arranged within the rear housing 3, or to an external power supply.

The base plate 13 has a plurality of openings 17 which are positioned to rearward of the black light lamp 15, and formed along same at predetermined intervals.

The plurality of openings 17 receive auxiliary lamps 19, respectively, which serve as an auxiliary light source. Thus, the black light lamp 15 is positioned ahead of the auxiliary lamps 19 as viewed from the front side of the instrument arrangement. The auxiliary lamps 19, which generate white visible lights, for example, are mounted to the base plate 13 with a wiring plate 21 which connects the auxiliary lamps 19 to the power supply within the rear housing 3, or to the external power supply.

Each of the auxiliary lamps 19 as mounted to the base plate 13 through the opening 17 has a head slightly projected into the front housing 1. Accordingly, the auxiliary lamps 19 are located slightly below the black light lamp 15, respectively. By arranging the black light lamp 15 and the auxiliary lamps 19 in that manner, the lamp 15 shuts out the lamps 19 with respect to a front window 30 of the vehicle.

It is to be noted that such arrangement form of the lamp 15 and same 19 is not limitative, but variable with an inclination of the front window 30.

Next, the operation of the first preferred embodiment will be described.

During the day and without turning on the black light lamp 15, since the indicating portion 7 is in natural light, the needles 11 assume a white, whereas the background of the dial 9 assumes a dark gray. By the shade contrast between the two, excellent visibility of the indicating portion 7 can be obtained.

On the other hand, if the black light lamp 15 is turned on when natural light is not sufficient to assure visibility of the indicating portion 7, e.g., in the night, the lamp 15 emits ultraviolet rays with which the entirety of the dial 9 is irradiated. As a result, the fluorescent materials as placed on the graduations, characters, needles 11, and the like are excited to assume a light brown or a red. By the color contrast with the background of the dial 9, excellent visibility of the graduations, characters, needles 11, and the like can be obtained.

When the temperature in the cabin is low, the auxiliary lamps 19 are turned on due to a decrease in intensity of radiation of the black light lamp 15. The auxiliary lamps 19 radiate visible lights by which the entirety of the indicating portion 7 is illuminated, thus contributing the maintenance of excellent visiblity of the indicating portion 7. In order to determine a lighting timing of the auxiliary lamps 19, the temperature within the front housing 1 is detected, for example. And, when the detected temperature becomes smaller than a predetermined value, the auxiliary lamps 19 are turned on. Alternatively, a cabin side temperature sensor of an air conditioner may serve as temperature detecting means. Alternatively, intensity of radiation of the black light lamp 15 may be used without relying upon a temperature detection. In that event, when a level of intensity of radiation detected becomes smaller than a predetermined level, the auxiliary lamps 19 are turned on.

Since the head of each of the auxiliary lamps 19 only sightly protrudes from the opening 17 of the base plate 13, and the black light lamp 15 is arranged between the auxiliary lamps 19 and the front cover 5, visible lights as emerged from the auxiliary lamps 19 may not directly reach driver's eyes even if the front cover 5 is transparent. Additionally, since the black light lamp 15 is so arranged as to shut out the auxiliary lamp 19 relative to the front window 30, a so-called front window reflection may be prevented.

Further, since the black light lamp 15 is positioned ahead of the auxiliary lamps 19 as viewed from the front side of the instrument arrangement, the lamp 15 may maximally be kept apart from the dial 9. This allows the dial 9 to receive ultraviolet rays of substantially the same intensity in a vertical direction thereof from the black light lamp 15, preventing a problem that a lower portion of the dial 9 is more clearer than an upper portion thereof, resulting in an improvement of visibility of the dial 9.

Referring to FIG. 3, in a second preferred embodiment, a rear surface of the black light lamp 15 serves as a reflecting surface for reflecting visible lights emerged from the auxiliary lamps 19. Specifically, a bracket 1a is formed with a bottom of the front housing 1 to mount the auxiliary lamps 19. The bracket 1a has an upper end formed with a roof portion 23 to cover the auxiliary lamps 19. The auxiliary lamps 19 are located substantially just behind the black light lamp 15, and opposite to the rear surface or reflecting surface 15a of the black light lamp 15. Accordingly, visible lights as emerged from the auxiliary lamps 19 are reflected by the reflecting surface 15a of the black light lamp 15 to illuminate substantially the entirety of the dial 9. The reflecting surface 15a is so constructed as to have a predetermined curvature which assures the reflection of visible lights to an upper portion of the dial 9.

The roof portion 23 prevents visible lights of the auxiliary lamps 19 from leaking out upwardly, and concentrates same on the reflecting surface 15a of the black light lamp 15.

Thus, in the second preferred embodiment, visible lights as emerged from the auxiliary lamps 19 reach less the front window 30, more effectively preventing the front window reflection.

Further, due to lengthened path of visible lights of the auxiliary lamps 19, the dial 9 may receive visible lights of substantially the same intensity in the vertical direction thereof, resulting in more improved visibility of the dial 9.

Furthermore, since the roof portion 23 is arranged to cover the auxiliary lamps 19, the lamps 19 is not visible directly through the front cover 5.

Figure 4:
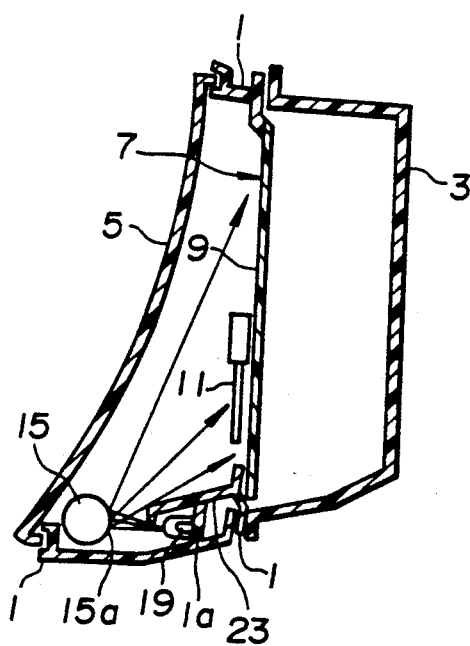
FIG. 4 is a view similar to FIG. 3, illustrating a third preferred embodiment of an instrument arrangement of an automotive vehicle according to the present invention.

Referring to FIG. 4, in a third preferred embodiment, the roof portion 23 is formed with the front housing 1. This results in substantially the same effect as the second preferred embodiment, and also a decrease in manufacturing cost of the instrument arrangement.

Figure 5:
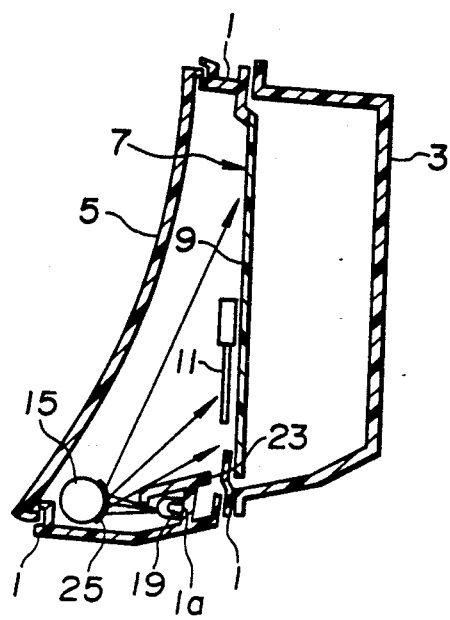
FIG. 5 is a view similar to FIG. 4, illustrating a forth preferred embodiment of an instrument arrangement for an automotive vehicle according to the present invention.
Figure 6:
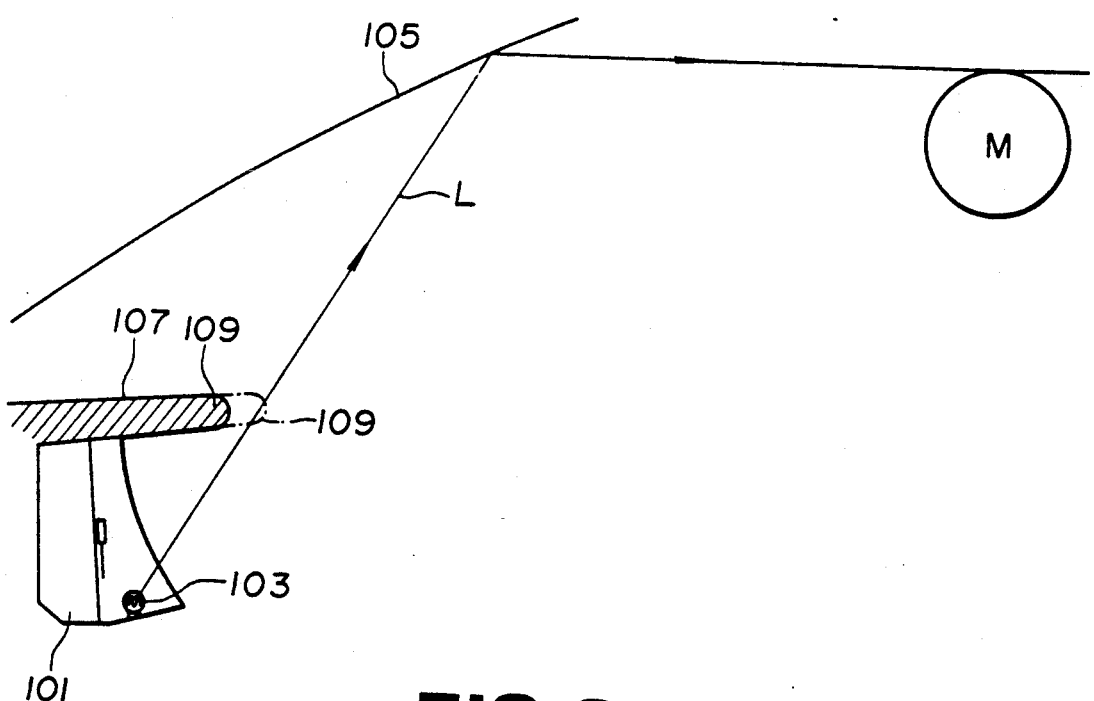
FIG. 6 is a view similar to FIG. 5, with a front window, a hood, and a passenger, showing a reflection of an auxiliary light source in the front window.

Referring to FIG. 5, in a fourth preferred embodiment, the reflecting surface 15a is formed with a film member for use of optical adjustment such as an optical tape 25. The optical tape 25 is made of aluminum, and placed on the rear surface of the black light lamp 15. This tape 25, not an indispensable member, is arranged to prevent intensity of radiation of ultraviolet rays in a lower portion of the dial 9 from extremely increasing.

Thus, the fourth preferred embodiment has substantially the same effect as the second preferred embodiment. Due to the aluminum tape 25 placed on the rear surface of the black light lamp 15, visible lights as emerged from the auxiliary lamps 19 are surely reflected by the tape 25 to illuminate substantially the entirety of the dial 9, resulting in more improved visibility of the dial 9.

It is to be noted that the reflecting surface 15a of the black light lamp 15 may be constructed by vapor deposition instead of placing the optical tape 25.

Having described the preferred embodiments of the present invention, it is understood that the present invention is not limited thereto, and that various changes and modifications may be made in the present invention.

In the embodiments, with regard to the display portion 7, for example, a fluorescent material is placed on the graduations, characters, etc., whereas a dark gray paint is placed on the background of the dial 9. Alternatively, the fluorescent material may be placed on the background of the dial 9, whereas a nonfluorescent white paint may be placed on the graduation, character, etc. In that event, when the fluorescent material is excited by ultraviolet rays, and emits visible light, the background of the dial 9 turns white, and the graduations, characters, etc. turn dark on the silhouette effect.

Further, in the embodiments, a description has been made with regard to the combination meter. It is to be noted that the present invention is also applicable to a separate meter such as a speedometer.

What is claimed is:

1. An instrument arrangement for an automotive vehicle, comprising:
    a housing
    indicating means arranged within said housing, said indicating means having one surface on which a fluorescent material is disposed;
    at least one visible light lamp, said visible light lamp being arranged within said housing on the same side of said one surface of said indicating means;
    at least one invisible light lamp, said invisible light lamp being arranged within said housing on the same side of said one surface of said indicating means, said invisible light lamp being arranged to be more distant from said one surface of said indicating means than said visible light lamp; and
    means on said invisible light lamp for reflecting visible lights of said first visible light lamp toward said indicating means, said reflecting means including a film member placed on a surface of said invisible light lamp.

2. An instrument arrangement as claimed in claim 1, wherein said film member includes an aluminum tape.

3. An instrument arrangement as claimed in claim 1, further including means for concentrating light of said visible light lamp toward said invisible light lamp.

4. An instrument arrangement as claimed in claim 3, wherein said concentrating means include a roof of a bracket fixed to said housing.

5. An instrument arrangement as claimed in claim 1 including a plurality of visible light lamps.

6. An instrument arrangement as claimed in claim 3, wherein said invisible light lamp includes a black light lamp.

* * * * *